Figure 1:
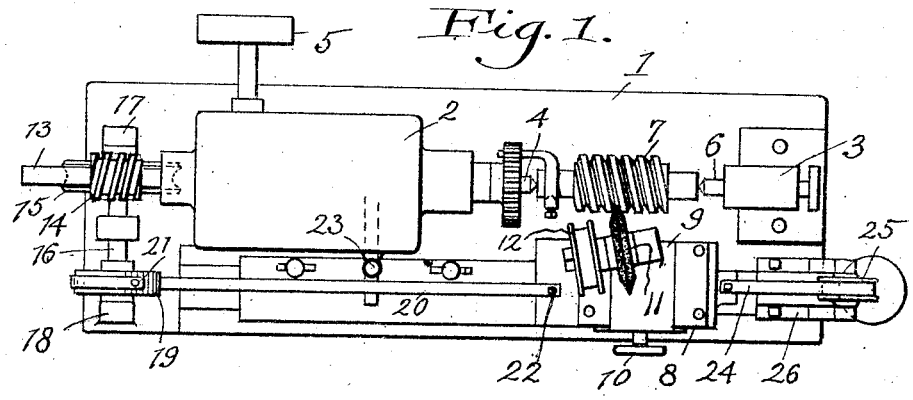

April 27, 1926.

O. G. SIMMONS 1,582,313

METHOD AND MEANS FOR CAUSING ACCURATELY PREDETERMINED RELATIVE
MOVEMENTS OF A TOOL WITH RESPECT TO THE WORK

Filed Oct. 13, 1923

Inventor
Oliver G. Simmons
By Thurston Know & Hudson
Attorneys

Patented Apr. 27, 1926.

1,582,313

UNITED STATES PATENT OFFICE.

OLIVER G. SIMMONS, OF CLEVELAND, OHIO, ASSIGNOR TO SIMMONS METHOD HOB COMPANY, OF CLEVELAND, OHIO, A CORPORATION OF OHIO.

METHOD AND MEANS FOR CAUSING ACCURATELY PREDETERMINED RELATIVE MOVEMENTS OF A TOOL WITH RESPECT TO THE WORK.

Application filed October 13, 1923. Serial No. 668,275.

*To all whom it may concern:*

Be it known that I, OLIVER G. SIMMONS, a citizen of the United States, residing at Cleveland, in the county of Cuyahoga and State of Ohio, have invented a certain new and useful improvement in method and means for causing accurately predetermined relative movements of a tool with respect to the work, of which the following is a full, clear, and exact description.

This invention relates to a method and means for accurately predetermining movements of a tool with respect to the work and more particularly to the accurate generation of surfaces on metal blanks.

In various machine operations, such for instance as generation of helical threads or teeth for gears, cutters and the like, it is necessary that the tool have certain predetermined relative movements or adjustments with respect to the work and the accuracy with which the various surfaces are generated on the work depends upon the accuracy of such movements or adjustments of the tool with respect to the work.

In manufacturing certain machine parts, tools and other articles, the greatest possible accuracy is desirable and in order to obtain this accuracy, repeated finishing operations are required. It is therefore highly important that inaccuracies due to irregularities and imperfections in the mechanism for causing relative movement between the tool and the work be reduced to an absolute minimum. In the most accurate machines heretofore constructed, the relative linear movements between the work and tool have been accomplished by means of lead screws driven from the work holder or set by suitable indexing devices. The movements and adjustments effected in this manner while fairly accurate, nevertheless, necessarily produce small errors in the work by reason of inaccuracies in the threads of the screws. Even the most carefully formed screws have these inaccuracies or irregularities due to the imperfections of the machines by which they were produced. While absolute perfection is of course impossible, it is very desirable to eliminate any source of error in machines of this character.

The main object of the present invention is to very accurately determine the linear movements or adjustments of the tool with respect to the work whereby more perfect work can be turned out by machines of the character referred to.

A further object is to provide carriage adjusting means which is inexpensive and in which the parts are readily replaceable to adapt the machine for different operations.

In accordance with the present invention, the inaccuracies in the linear movements and adjustments of the carriage are practically eliminated by replacing the usual lead screw by a flexible inextensible member in the form of a flat steel tape which is fixed at one end to the movable carriage and at its other end to a cylindrical surface on a rotatably mounted actuating member. Cylindrical surfaces can be turned with extreme accuracy and with a cylinder of a given diameter, the linear movement of the tape and consequently of the carriage will be in exact ratio to the angular movement of the cylinder. The rotary movement of the cylinder may be very accurately timed with respect to that of the work or the angular movement thereof may be very accurately determined by a suitable indexing device. Any slight variations in the length of the tape due to temperature changes will be compensated for by the expansion of the cylinder. The diameter of the cylinder may be so proportioned to the length of the tape that errors due to temperature changes will be practically eliminated. In order to maintain a substantially uniform tension on the tape and to cause the return movement of the carriage, a counterweight is provided which exerts a constant pull on the carriage in the direction opposite that in which the carriage is moved by the tape.

Figure 2:
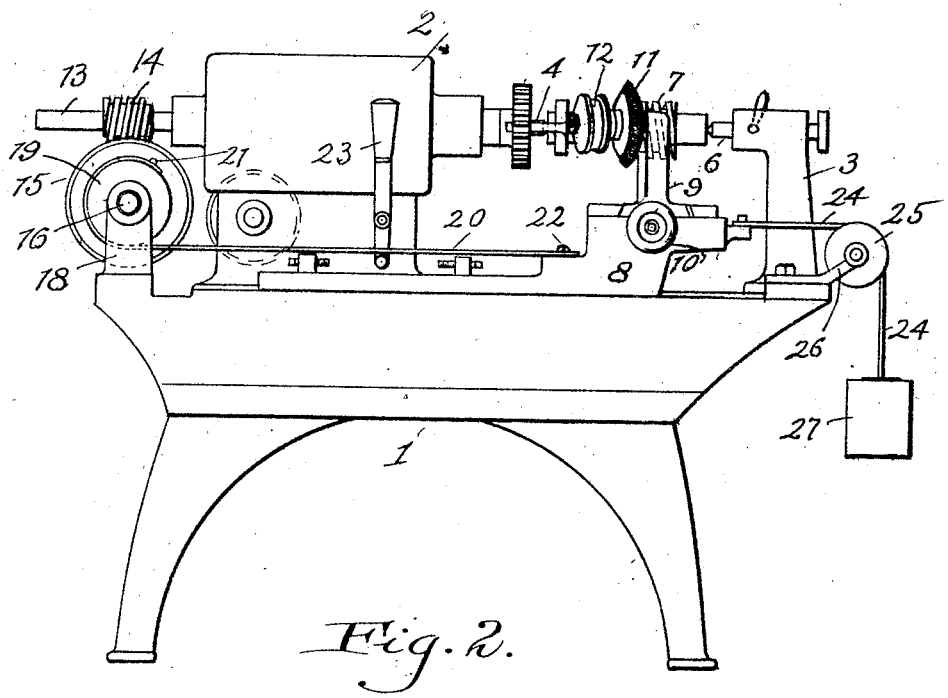

Reference should be had to the accompanying drawings, forming a part of this specification in which Fig. 1 is a top plan view of a machine embodying the invention; Fig. 2 is a side elevation thereof.

In the accompanying drawings I have illustrated a simple embodiment of the invention in a machine for finishing spiral threads or teeth by means of a rotating grinding tool. It is to be understood, however, that the invention is applicable generally to machines for operating on metal blanks and may be embodied in machines widely different from that shown herein, a simple machine having been chosen as best adapted to illustrate the principle of the invention.

Referring to the accompanying drawings, the machine shown herein is provided with the usual bed 1 on which is mounted a headstock 2 and tailstock 3, the headstock carrying the live spindle 4 which may be driven through gearing in the head (not shown) from a drive pulley 5 as is common in such machines, and the tailstock 3 having a dead spindle 6 aligned with the spindle 4 and adjustable toward and from the spindle 4 to hold the work 7. Movable longitudinally of the bed 1 is a carriage 8 which in turn carries a transversely movable carriage 9 upon which the tool is mounted, the carriage 9 being provided with suitable adjusting means operated by the hand-wheel 10. The tool shown herein is a grinding wheel 11 carried by a shaft journaled in the tool support and adapted to be driven through a flanged pulley 12 which receives a belt from an overhead drive shaft. For operating the carriage shifting mechanism, a shaft 13, which is driven through a suitable reversing gear within the head (not shown), extends rearwardly from the head and serves to drive the carriage shifting mechanism through suitable reduction gearing.

The mechanism above described is old and well known, the present invention being directed solely to the method and means whereby the tool is given accurately predetermined linear movements with respect to the work. The shaft 13 carries a worm 14 which meshes with a worm wheel 15 fixed to a transverse shaft 16, which is journaled in bearings 17 and 18 which are fixed to the bed. The worm and worm wheel shown herein merely serve as an illustration of a reduction gearing suitable for the machine shown, the particular form of reduction gearing employed is, however, immaterial in so far as the present invention is concerned. The reduction gearing in each case should be of the type best adapted to maintain an accurately proportioned movement of the carriage adjusting device.

The shaft 16 has a cylinder 19 fixed thereto and an inextensible flexible member in the form of a flat flexible steel strip or tape 20 is fixed at one end to the surface of the cylinder and at the other to the carriage, suitable means 21 being provided for rigidly attaching the tape to the cylinder and similar means 22 being provided for rigidly attaching the opposite end of the tape to the carriage 8.

By reference to Fig. 2 it will be readily seen that when the cylinder 19 is turned in a clockwise direction, the tape will be wound thereon and the carriage 8 will be shifted a distance which is in exact ratio to the angular movement of the cylinder. A suitable controlling lever 23 for the reversing gear within the headstock permits the direction of rotation of the shaft 13 to be reversed to enable the tool to be returned to starting position after it has completed its forward movement along the work.

In order to cause the return movement of the carriage and to maintain the tape 20 at all times under substantially uniform tension, a counterweight is provided which acts in opposition to the tape 20. To this end a flexible member 24 which is preferably in the form of a flat steel tape is fixed to the carriage 8 and extends therefrom in a direction opposite that of the tape 20. The tape 24 passes over a flanged sheave 25 which is journaled in a bracket 26 fixed to the bed 1 adjacent the rear end thereof and has a counterweight 27 attached to its lower end, the counterweight 27 having sufficient weight to maintain a constant tension on the tape 20.

In the machine shown the speed of rotation of the cylinder 19 is so proportioned to the speed of rotation of the work that the carriage 8 will be moved uniformly at a speed such that the grinding tool 11 will engage the work along a true helical line and will not be caused to deviate from such true helical line by reason of irregularities in its shifting mechanism.

Having described my invention, I claim—

1. The method of accurately predetermining the relative linear movement of a tool carrying member with respect to a work carrying member which comprises imparting linear movement to one of the members through a flexible inextensible pull member attached to the movable member and extending therefrom in the direction of movement by causing endwise movement in a straight line of the portion of the pull member extending from the movable member by progressively bending the opposite end of the pull member at a predetermined rate into the form of a segment of a cylinder which has a fixed axis and is tangential to the straight portion of the pull member.

2. The method of accurately predetermining the movement of a tool with respect to the work, which comprises imparting said movement through an inextensible, flexible pull member, by imparting to a position thereof an accurately predetermined bending movement, and compensating for variations in the length of the flexible member resulting from expansion and contraction due to temperature variations.

3. The combination with a machine having a support with a work carrying member and a tool carrying member thereon, one of said members being mounted for linear movement along a guideway on the support, of means for imparting an accurately predetermined movement to the movable member comprising a flexible inextensible pull member attached at one end to said movable member, an actuating member having a cylindrical surface and mounted to turn about the axis of said cylindrical surface, said axis being fixed and the opposite end of said pull member being atached to said cylindrical surface, said pull member, between said actuating member and said movable member, being at all times parallel with said runway, and means for turning said actuating member at a predetermined rate.

4. The combination with a machine having a support with a work carrying member and a tool carrying member thereon, one of said members being movably mounted, of means for imparting an accurately predetermined movement to said member comprising a one-piece inextensible but flexible pull member in the form of a flat steel attached at one end to said movable member, and a rotatably mounted actuating member having a cylindrical surface to which the opposite end of said pull member is attached, the diameter of said cylinder being so proportioned with respect to the length of said pull member that variations in the length of the pull member due to temperature variations are compensated for.

5. The combination with a machine having a support with a work carrying member and a tool carrying member thereon, one of said members being movably mounted to travel along a runway on the support, of means for causing an accurately predetermined movement of said movable member comprising a flat steel tape fixed at one end to said movable member and extending therefrom in a straight line parallel with said runway, an actuating member rotatable about a fixed axis and having a cylindrical surface concentric with the axis of rotation and tangential to the straight portion of the tape to which the opposite end of the tape is fixed, means for imparting a rotating movement at a predetermined rate to said actuating member, and means for exerting a substantially constant pull on the movable member to maintain said tape under a substantially constant tension.

6. The combination with a machine having a support with a rotatable work carrying member and a tool carrying member thereon, said tool carrying member being mounted for movement along a runway on the support, of means for imparting an accurately predetermined linear movement to the tool carrying member comprising a flat steel tape fixed at one end to said movable member, a rotatably mounted actuating member having a cylindrical surface concentric to its axis of rotation to which the opposite end of the tape is fixed, said tape from said tool carrying member to said cylindrical surface being parallel to the runway, and means for rotating the work carrying member and for imparting a rotating movement to said actuating member at a rate bearing a fixed ratio to the rate of rotation of the work.

7. The combination with a machine having a support with driven means thereon for rotatably supporting the work and a carriage thereon for supporting a tool for movement along the work, of means for causing accurately predetermined movements of the tool along the work comprising a flat steel tape fixed at one end to the carriage and extending in the direction of movement of the carriage, a rotatably mounted actuating member having a fixed axis of rotation and a cylindrical surface concentric with said axis to which the opposite end of the tape is fixed and a reduction gearing connecting the driven work supporting means and actuating member.

8. In combination with a machine tool having a support with driven means thereon for rotatably supporting the work and a carriage thereon for supporting a tool for movement along the work, of means for causing accurately predetermined movements of the tool along the work comprising a flat steel tape fixed at one end to the carriage and extending in the direction of movement of the carriage, a rotatably mounted actuating member having a fixed axis of rotation and a cylindrical surface concentric with said axis to which the opposite end of the tape is fixed and a reduction gearing connecting the driven work supporting means and actuating member, and means exerting a substantially constant pull on said carriage in opposition to the actuating member whereby said tape is maintained under a substantially constant tension.

In testimony whereof, I hereunto affix my signature,

OLIVER G. SIMMONS.

Certificate of Correction.

It is hereby certified that in Letters Patent No. 1,582,313, granted April 27, 1926, upon the application of Oliver G. Simmons, of Cleveland, Ohio, for an improvement in "Methods and Means for Causing Accurately Predetermined Relative Movements of a Tool with Respect to the Work," an error appears in the printed specification requiring correction as follows: Page 3, line 20, claim 4, after the word "steel" insert the word *tape;* and that the said Letters Patent should be read with this correction therein that the same may conform to the record of the case in the Patent Office.

Signed and sealed this 8th day of June, A. D. 1926.

[SEAL.]

M. J. MOORE,
*Acting Commissioner of Patents.*